(No Model.) 8 Sheets—Sheet 1.
J. J. GAYNOR.
SELF BINDING ATTACHMENT FOR REAPING MACHINES.

No. 546,319. Patented Sept. 17, 1895.

Fig. 1.

WITNESSES:

INVENTOR
John J. Gaynor,
BY
Chester F. Bradford,
ATTORNEY.

(No Model.) 8 Sheets—Sheet 2.

J. J. GAYNOR.
SELF BINDING ATTACHMENT FOR REAPING MACHINES.

No. 546,319. Patented Sept. 17, 1895.

WITNESSES:

INVENTOR
John J. Gaynor,
BY
Chester ?. Bradford,
ATTORNEY.

(No Model.) 8 Sheets—Sheet 4.

J. J. GAYNOR.
SELF BINDING ATTACHMENT FOR REAPING MACHINES.

No. 546,319. Patented Sept. 17, 1895.

WITNESSES:
Edgar A. Kingsley
James A. Walsh

INVENTOR
John J. Gaynor,
BY
Chester F. Wadford,
ATTORNEY.

(No Model.) 8 Sheets—Sheet 5.

J. J. GAYNOR.
SELF BINDING ATTACHMENT FOR REAPING MACHINES.

No. 546,319. Patented Sept. 17, 1895.

WITNESSES:

INVENTOR
John J. Gaynor,
BY
Chester J. Bradford,
ATTORNEY.

(No Model.)  8 Sheets—Sheet 7.

J. J. GAYNOR.
SELF BINDING ATTACHMENT FOR REAPING MACHINES.

No. 546,319.  Patented Sept. 17, 1895.

Fig. 14.

WITNESSES:
Edgar A. Kingsley
James A. Walsh

INVENTOR
John J. Gaynor,
BY
Chester J. Bradford,
ATTORNEY.

(No Model.) 8 Sheets—Sheet 8.

J. J. GAYNOR.
SELF BINDING ATTACHMENT FOR REAPING MACHINES.

No. 546,319. Patented Sept. 17, 1895.

WITNESSES:
Edgar A. Kingsley
James A. Walsh.

INVENTOR
John J. Gaynor,
BY
Chester J. Bradford,
ATTORNEY.

UNITED STATES PATENT OFFICE.

JOHN J. GAYNOR, OF INDIANAPOLIS, INDIANA, ASSIGNOR TO THE GAYNOR STRAW BINDER COMPANY, OF SAME PLACE.

SELF-BINDING ATTACHMENT FOR REAPING-MACHINES.

SPECIFICATION forming part of Letters Patent No. 546,319, dated September 17, 1895.

Application filed July 31, 1894. Serial No. 519,089. (No model.)

*To all whom it may concern:*

Be it known that I, JOHN J. GAYNOR, a citizen of the United States, residing at Indianapolis, in the county of Marion and State of Indiana, have invented certain new and useful Improvements in Self-Binding Attachments for Reaping-Machines, of which the following is a specification.

The object of my said invention is to produce a self-binding attachment for reaping-machines, in which the bands for tying the bundles are to be formed from the straw of the bundles being tied, thus forming the bundles complete at the same time the operation of reaping is going on, and dispensing with twine or other separate binding material.

Briefly stated, said invention consists in providing mechanism which shall not only clamp the straw into bundles, but is provided with fingers which travel circumferentially of the bundle being formed, selecting at several points a few straws and withdrawing them from the common mass and winding them around the middle or "waist" of the bundle, after which other devices tuck the ends under and complete the tying or twisting of the several wisps into a complete band. The devices for packing the straw into the cradle where the bundle is formed are substantially the same as those employed in the ordinary twine-binder; and my invention almost wholly consists in the devices by which the straws are selected out and wound around the bundle and formed into the band and tied or tucked under, so as to have the effect of tying, as stated.

A machine embodying my said invention will be first fully described, and the novel features thereof then pointed out in the claims.

Referring to the accompanying drawings, which are made a part hereof, and on which similar letters of reference indicate similar parts, Fig. 15, a view as seen from the dotted line 15 15 in Fig. 14; Fig. 16, a detail sectional view as seen from the dotted line 16 16 in Fig. 14, and Fig. 17 a detail sectional view as seen from the dotted line 17 17 in Fig. 15.

Figure 4:
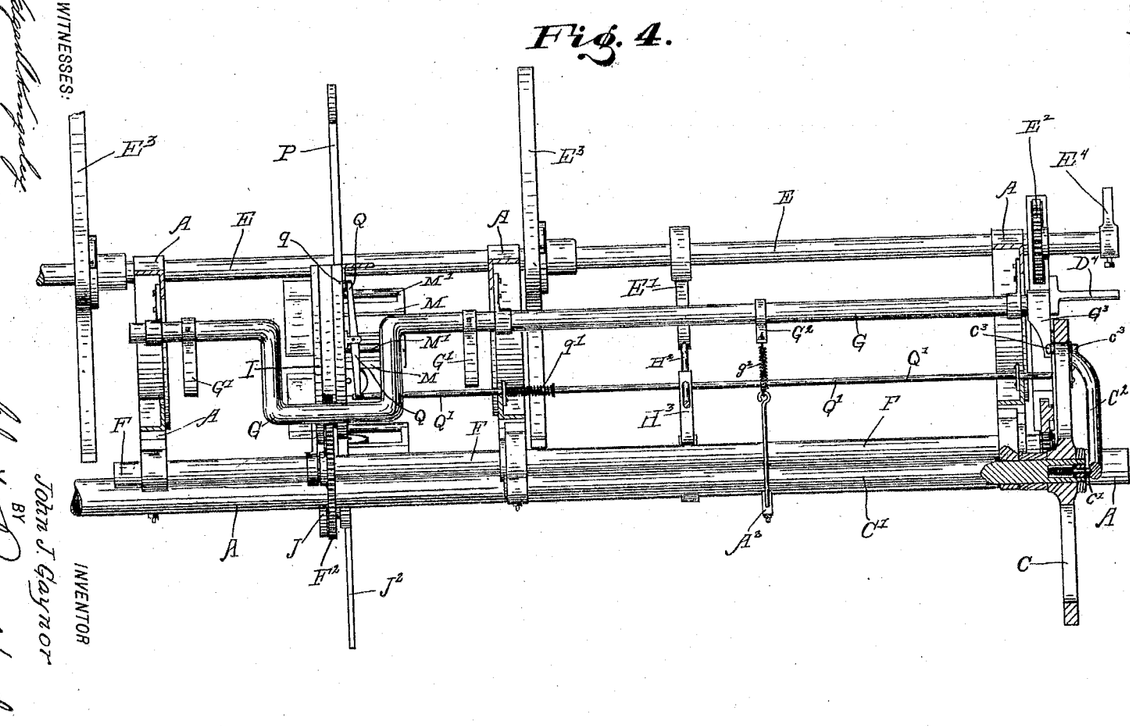
Fig. 4, a sectional view of a part of the binder mechanism as seen from the dotted lines 4 4 in Figs. 5, 6, and 7.
Figures 15, 16, 17:
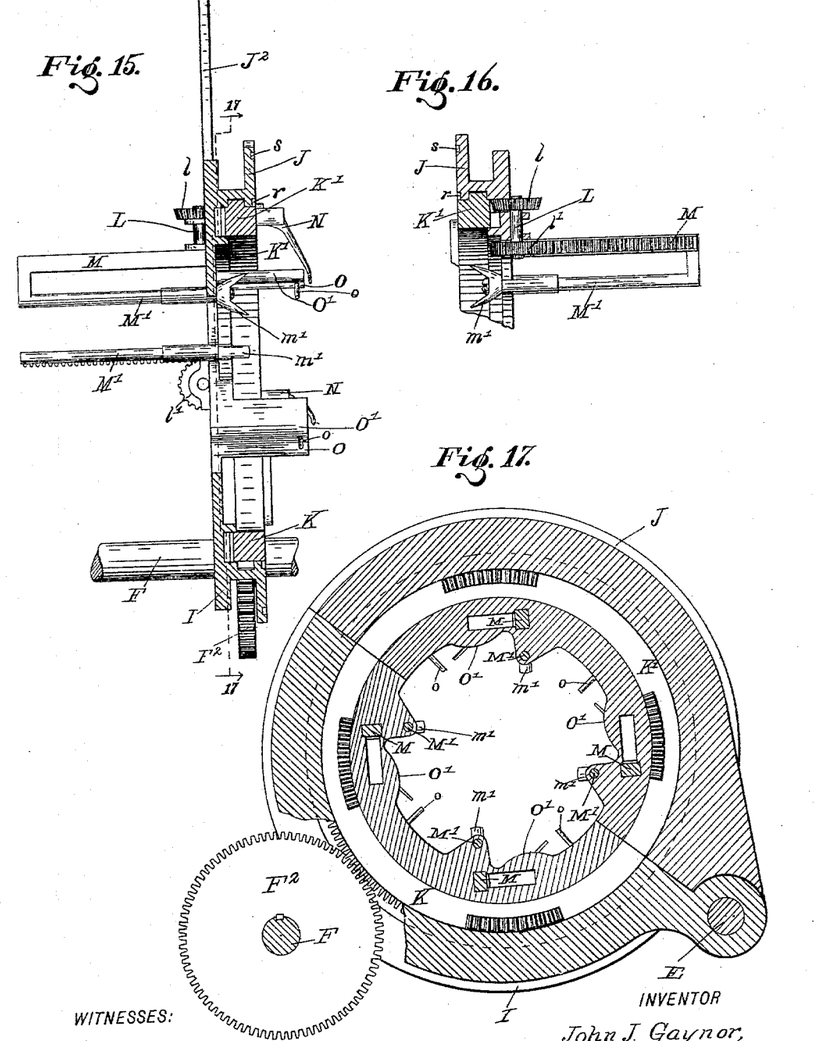

My self-binding attachment as a whole is secured upon the reaping-machine by mounting its frame A upon the frame 1 of such machine and securing it thereto by means of clamps $a$ and braces $a'$, and said frame is preferably composed of angle-iron ribs, which are curved at the proper point to form a cradle to receive the grain, and gas-pipe cross-bars connecting said ribs, as shown, with a projecting loop A' for the movable part J of the binding-ring, and a grooved way $A^2$ for the rack-bar D. Said frame embodies bearings for the various devices constituting the mechanism of this invention, and, as a whole, including said mechanism, it can be attached to the reaping-machine at any desired angle. Its main shaft B is driven by the same chain-belt 2 which drives a portion of the mechanism of said machine (which mechanism is of the ordinary or any desired character) by engaging with a sprocket-wheel B' on said shaft. This shaft is in line with and practically forms a continuation of the packer-shaft $B^2$, and, when the binding mechanism is not in operation, drives said packer-shaft and through it the packers $B^3$, by means of an ordinary clutch composed of two parts $b$ and $b'$, the shifting part $b$ whereof is operated from the "needle-shaft" at the proper time, as elsewhere described. A spur-gear wheel C (preferably loosely mounted on a stud-shaft C' and driven directly by a spur-gear $B^4$ on the shaft B) drives, through a pitman $C^2$, a reciprocating rack-bar D, which operates the needle-shaft E from one rack or set of cogs and the driving-shaft F of the tying mechanism from another rack or set of cogs, as elsewhere described. This gear-wheel C is provided with teeth for the greater portion of its circumference, but at one point is unprovided with teeth, so that the wheel $B^4$ when opposite this point can revolve without operating said wheel C, and thus the packers are enabled to be operated while the remainder of the mechanism is permitted to remain at rest. The parts are so arranged that the pitman $C^2$ crosses the axis of the shaft on which the wheel C is mounted at the time when the wheel $B^4$ is thus permitted to revolve freely, and a spring-catch $c'$ (see Fig. 4) is mounted in a longitudinal perforation in the said shaft C' and engages with a corresponding latch-recess in the face of the pitman, the engagement being sufficient to support the pitman in place until force is applied, but not sufficient to resist such force, rendering it easy to start the machine into operation by simply applying a moderate force to said wheel. To effect this a "scale" or balance apparatus is provided, consisting of a shaft G having arms G', upon which the grain is thrown by the packers, which arms extend alongside the ring containing the binding mechanism and another arm $G^2$, to the outer end of which is secured one end of a spring $g^2$, the other end of said spring being attached to any convenient stationary part—e. g., an arm $A^3$ on a frame-rod. Upon the outer end of this shaft G is a finger $G^3$, and secured to the face of the wheel C is a spring-catch $c^3$, which projects out in the path of said finger. The operation is, when sufficient straw has been deposited on the arms G', that said arms will be depressed by the weight of said accumulated straw, thus distending the spring $g^2$, rocking the shaft G, and throwing the finger $G^3$ against the spring-catch $c^3$, propelling the spur gear-wheel C forward slightly sufficiently to throw its cogs into engagement with those of the wheel $B^4$, and thus causing said wheel C to be driven from said wheel $B^4$. The first result of this operation is to move the needle-shaft E somewhat, releasing the arm E' thereon from its engagement with the clutch-operating mechanism, thus permitting the movable clutch-part $b$ to (by means of the spring $H^4$) be thrown out of engagement with the stationary clutch part, which stops the movement of the packers temporarily while the binding mechanism is being operated. This clutch-operating mechanism consists of a bell-crank lever H, pivoted to a bearing H' on the framework, one arm of which engages with the movable portion of the clutch, and the other arm of which is connected to a rod $H^2$, which rests in bearings $H^3$ and extends back in the path of the arm E' on the shaft E. The operation is, when said arm E' comes in contact with the end of this rod $H^2$, that said arm pushes said rod upwardly in its bearings, rocking the bell-crank lever, throwing the clutch into engagement. When the shaft E is turned and the arm E' is no longer in contact with said arm $H^2$, then a spring $H^4$, which is attached to said rod between the bearings $H^3$, throws said rod backwardly, disengaging the clutch, as will be readily understood upon an inspection of the drawings, particularly Fig. 2. As the needle-shaft continues to revolve, it throws the upper half of the ring carrying the needle over, inclosing the bundle of straw which has been packed down into the ring. The spur-gear $E^2$ upon the end of this shaft E, by which the rack-bar D is enabled to operate the shaft E, has teeth only on a portion of its circumference, and when this point is reached the rack-bar escapes from said spur-gear $E^2$, and thence passes on free of engagement therefrom. At the same time the other set of teeth on said rack-bar D engages with the spur-gear F' on the end of the shaft F, and thus the tying mechanism is set in operation. This tying mechanism consists of a ring formed of two substantially equal parts, each of which has a hub mounted upon the shaft E, (and the upper or movable part of which is operated by said shaft,) and various attachments to be presently described. The lower half I is stationary, being secured at one end by its hub on the shaft E, as just stated, and at the other end to a bar $A^4$, forming a part of the framework A. The shaft E, in turning, revolves in the hub of this ring part, and does not move it. The other ring part J is similar in shape to the ring part I, (except that it has a "needle-point" J' and a stop-arm $J^2$,) and this part J is rigidly attached by means of its hub to the shaft E, so that when said shaft is revolved, this ring part J is moved back and forth from open to closed position, and thence back to open position again, thus inclosing the bundle while the tying operation is going on, and releasing it when the tying has been completed. Mounted upon this ring is the mechanism by which the tying is effected. It consists of a second ring correspondingly divided into two parts, K and K', and mounted in appropriate circular ways turned in the interior face of the ring parts I J. This secondary ring K K' is provided with teeth on its periphery, (see Fig. 17,) and is thus in effect a spur-gear, and is driven at appropriate times by a spur-gear $F^2$ on the shaft F, which engages therewith. As already partially, and hereinafter more fully, described, said shaft F is revolved a short distance in one direction and then a corresponding distance in the other direction during a single operation of this tying mechanism. It is manifest that this ring K K' is driven a certain distance in one direction and then returned to its original position. Upon one side of this ring K K' are several short sections of teeth, forming segmental gears, and mounted upon the ring-sections I and J are short transverse shafts L, bearing-gears $l$, which are, respectively, adapted to engage with the segmental gears just mentioned on the ring K K', and be driven thereby. Small spur-gears $l'$ are also mounted on these shafts L and engage with rack-bars M, mounted in bearings in and extending transversely of the ring parts I and J, and these rack-bars are connected to or formed integrally with tucking-fingers M', which are arranged parallel thereto and mounted in corresponding bearings on the ring parts I J, and these tucking-fingers have flaring points or heads $m'$, which engage with and tuck under the ends of the wisps of straw in tying the bundle. The operation is, during the back-and-forth movement previously described, that these tucking-fingers are thus forced through, performing their work, and then withdrawn to their original position, during the time the main ring is closed and grasping the waist of the bundle. In order to prevent the segments from operating upon other than the tucking mechanism for which they are respectively designed, they are, as shown in Fig. 17, arranged in different circular planes, two of them being in one plane and the other two in another. As the movement of the ring K K' does not exceed half a revolution, this arrangement is sufficient to obviate interference of one part with the other in the particular stated. The wisps of straw are gathered from the mass and carried around the waist of the bundle in position to be operated upon by the tucking-fingers, by gathering-fingers N, which are pivoted upon the ring K K', and are operated by cam-grooves $r\ s$ in the surface of the ring parts I J. These gathering-fingers operate in conjunction with projections O on said ring parts I J, and shields O', extending from said projections substantially over the gearing, operating the tucking-fingers. The operation is that these gathering-fingers, as the ring K K' is being revolved, engage with a few straws on the outside of the bundle, pulling them out of the common mass and carrying them around the waist of the bundle. The projections $o$ aid in this and cause the various wisps to lie alongside each other, the front end of one wisp being carried inside the rear of the adjoining wisp, and by means of the cam-grooves, being at a proper point, such front end is forced down into the bundle by the gathering-fingers. At this instant the tucking-fingers are operated, as heretofore described, forcing the end of each wisp under the adjoining wisp, and, as it has already been brought over down alongside and behind it, this completes the tying or binding operation and converts the several wisps into what is substantially a straw rope. The bending of the wisps of straw taken up by the gathering-fingers is rendered more exact by means of the secondary projections $o$, which extend from the outer ends of the lateral projections O inwardly in substantially radial lines toward the center of the ring in convenient position, so that said gathering-fingers bend the straw directly over them as they are carried around by the ring K K'. The continued operation of the mechanism unfastens and throws open the ring part J, and at the same time the arms $E^3$ on the shaft E throw off the completed bundle. A straw stop P is mounted upon the ring part I, and is operated by a segmental rack P' secured to the hub of the ring part J, the teeth of which engage in a straight rack formed upon said straw stop. These parts come into engagement immediately the completed bundle is thrown off and said straw stop is then raised into position to prevent the straw as it comes from the reaper from passing over the binding apparatus, and (the packers at this point resuming operation) straw is forced against this stop until the weight again operates the scale mechanism, when the operation heretofore described is repeated. The needle J' on the ring part J enters a suitable socket in the ring part I, which causes these parts to register perfectly whenever brought together. As there is considerable force exerted during the operation of tying the bundle, it is necessary that the parts should be locked together and a transverse pin $q$, mounted in the part I, extends through and is adapted to engage with a corresponding perforation in said needle when it reaches the position in its sheath or socket. A lever Q, mounted in a suitable bearing, also on the ring part I, is connected to a rod Q', which extends over to a point alongside the wheel C. Upon said wheel C is a strike $C^4$, adapted to come in contact with this rod each time said wheel revolves, and the parts are so positioned that this contact is made exactly when the tying has been completed, and the part J is to be released, and the consequent operation is that the pin $q$ is withdrawn and the part J released in time for the other mechanism to throw it open. The gathering-fingers N, above referred to, are mounted by means of pivots $n$ on the ring K K', and are provided on their outer ends with projections $n'$, (which may be armed with antifriction-rollers,) and said projections enter the cam-grooves $r\ s$ in the binding-ring parts I J, so that as the ring K K' is revolved, carrying said fingers, their inner projecting ends are moved inwardly and downwardly because of the engagement with said cam-grooves. The operation is that the points of the fingers are thus caused to enter the straw of the bundle somewhat, embracing a wisp thereof, and are then respectively raised out of the bundle, lifting the wisps which they have seized with them, and the continued revolution of the ring K K', carrying these fingers, carries the wisps of straw around the waist of the bundle alongside each other, each wisp crossing the one in advance of it in position to be forced down by the projections $o$, and afterward through underneath by the tucking-fingers $m'$. The butts of the straw extend through to the side of the ring on which these gathering-fingers are located, and so the heads of the grain are not at all disturbed by the operation of tying, but remain in position with the other heads of grain in the bundle, a small portion of the butts of straw alone forming the band.

Figure 1:
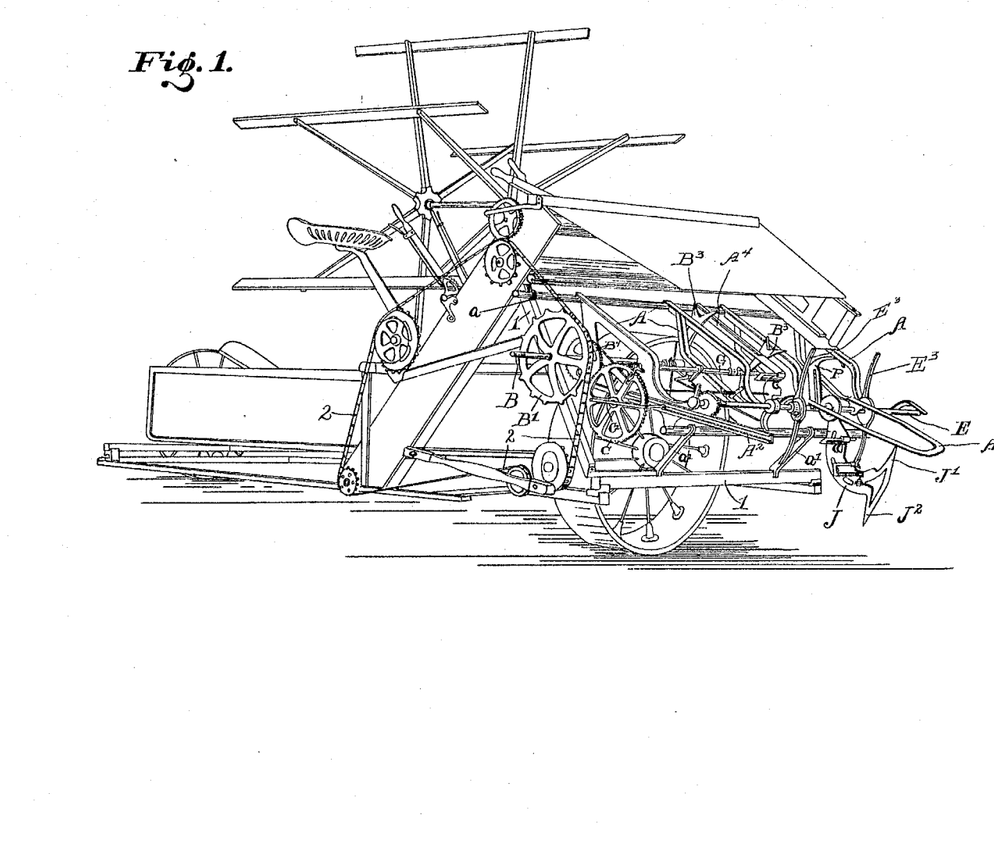
Figure 1 is a perspective view of a reaping-machine provided with my automatic straw-binding attachment and illustrating in in a general way the relative positions of the various parts.
Figures 2, 3:
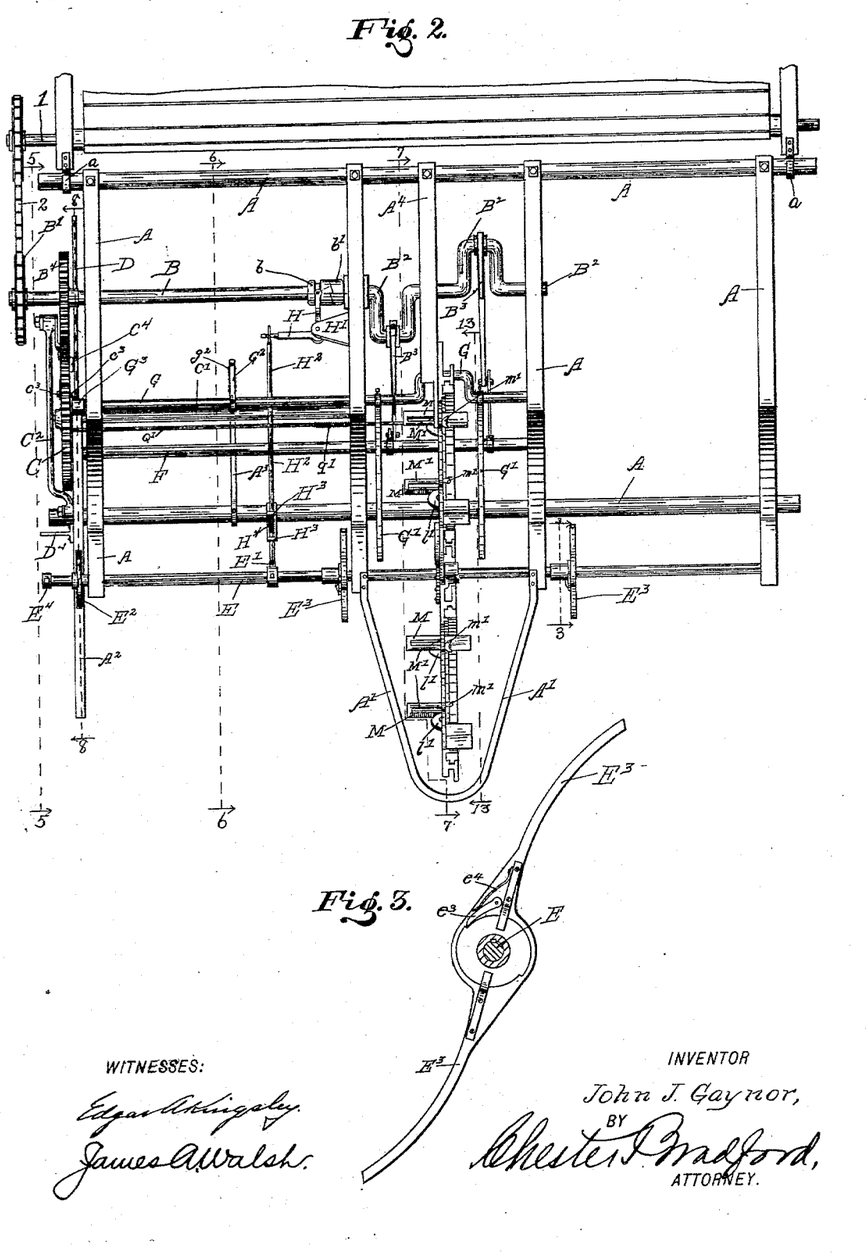
Fig. 2, a top or plan view of the binder mechanism as seen from the dotted line 2 2 in Fig. 5.
Fig. 3, a detail view, on a larger scale, of one of the arms for throwing off the bundles as seen from the dotted line 3 3 in Fig. 2.
Figures 5, 6, 7:
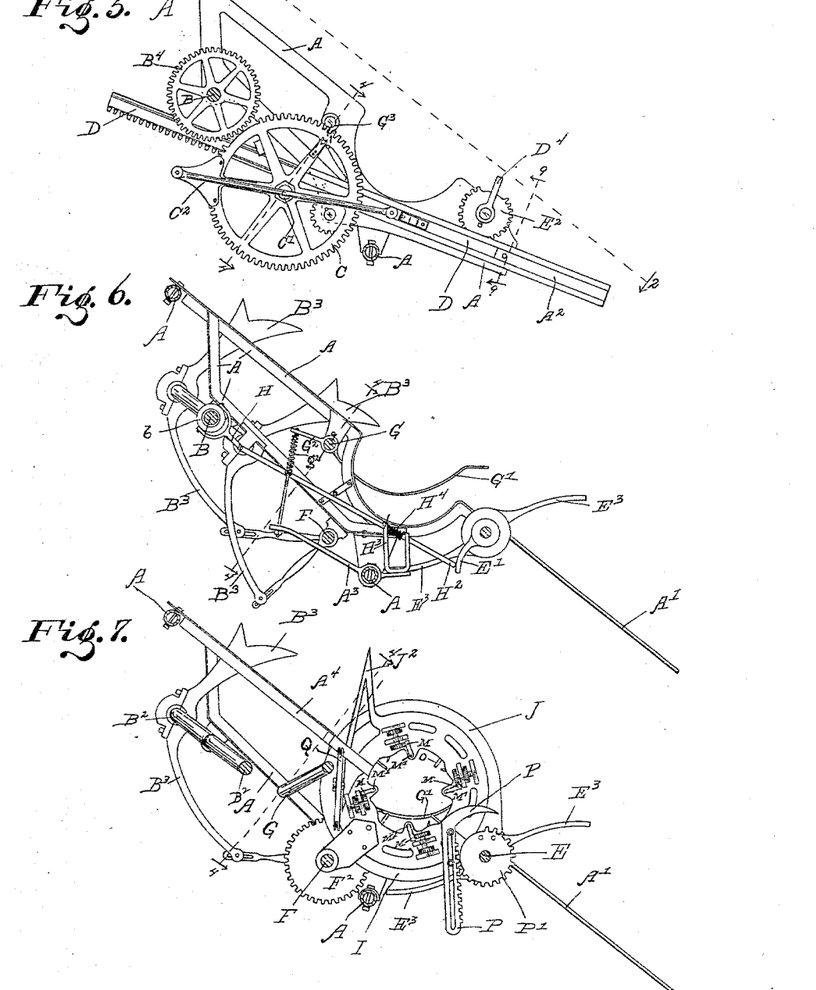
Fig. 5, an end elevation of the binder mechanism as seen from the dotted line 5 5 in Fig. 2.
Fig. 6, a transverse sectional view as seen from the dotted line 6 6 in Fig. 2.
Fig. 7, a transverse sectional view as seen from the dotted line 7 7 in Fig. 2.
Figures 8, 9, 10, 11, 12:
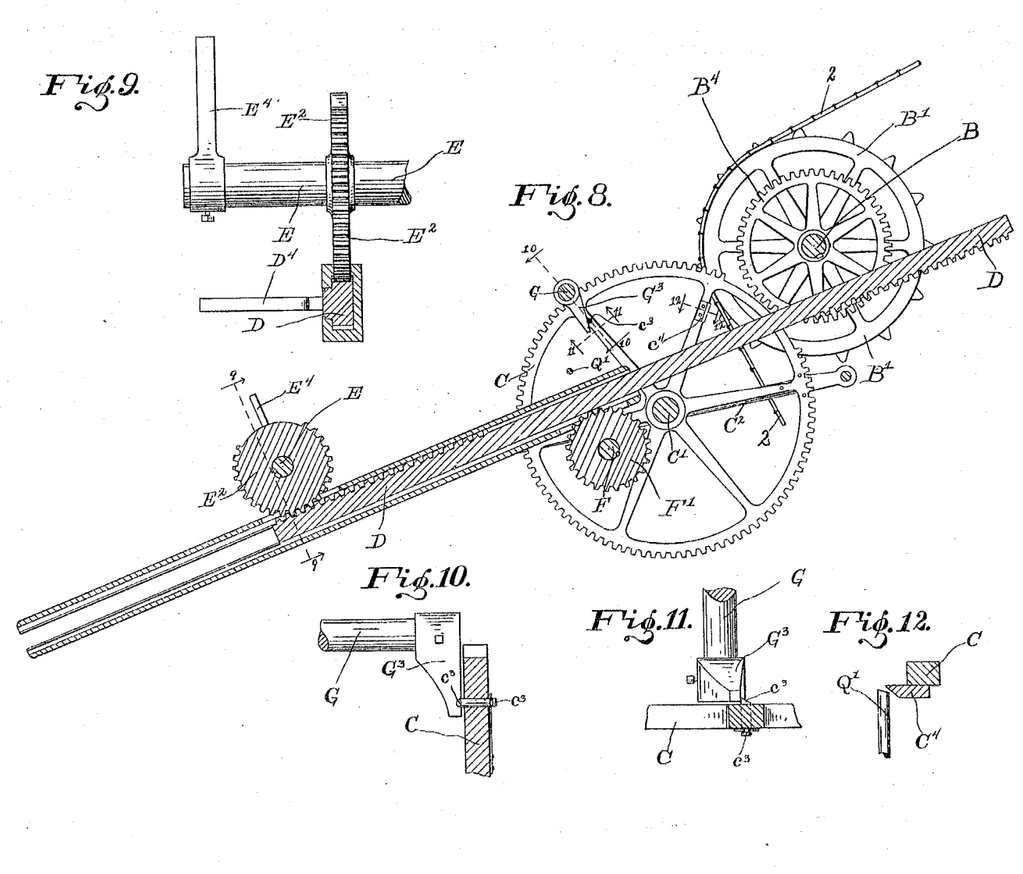
Fig. 8, a sectional view, on a larger scale, as seen from the dotted line 8 8 in Fig. 2.
Fig. 9, a detail transverse sectional view as seen from the dotted line in Figs. 5 and 8.
Fig. 10, a detail sectional view as seen from the dotted line 10 10 in Fig. 8.
Fig. 11, a detail sectional view as seen from the dotted line 11 11 in Fig. 8.
Fig. 12, a detail sectional view as seen from the dotted line 12 12 in Fig. 8.
Figure 13:
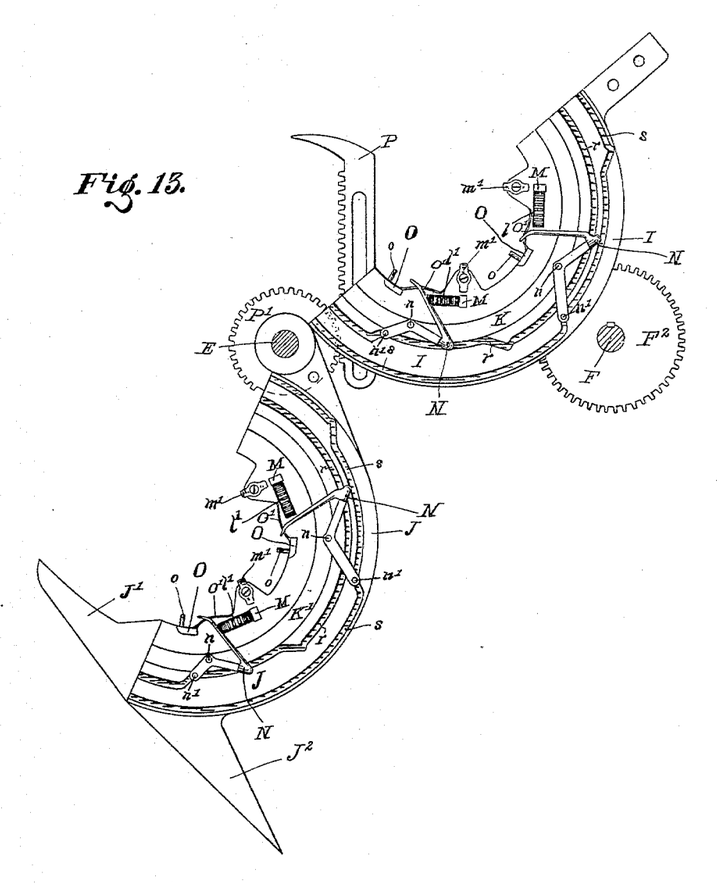
Fig. 13, a view, on a larger scale, as seen from the dotted line 13 13 in Fig. 2.
Figure 14:
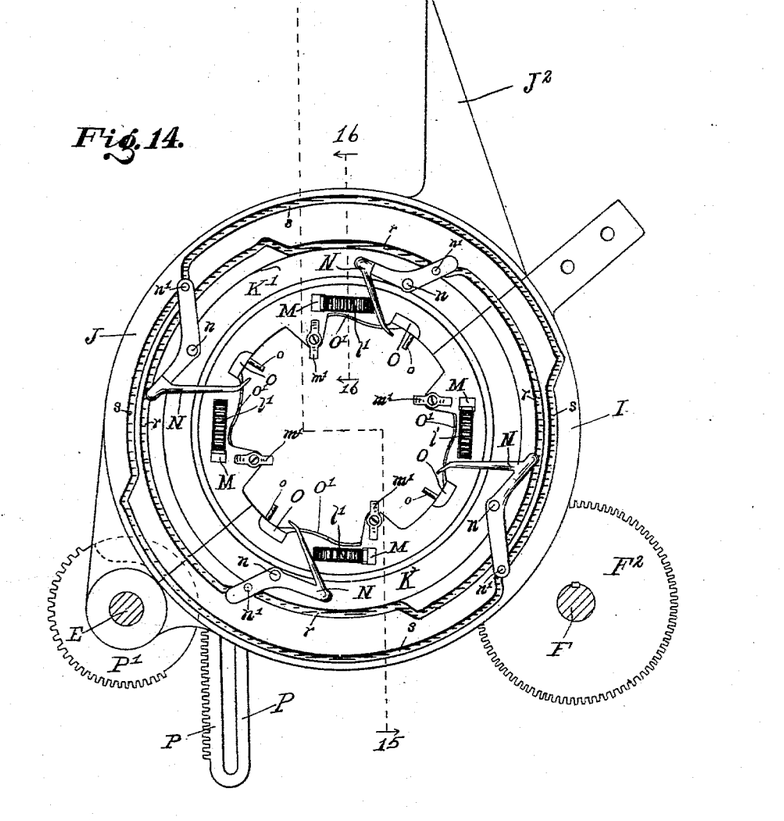
Fig. 14, a similar view to Fig. 13 with the ring closed.

The general operation of this apparatus is, briefly stated, as follows: The machine being in motion the shaft B is continually driven from the chain-belt 2. For the greater part of the time the clutch $b\ b'$ is in engagement and the crank-shaft $B^2$ drives the packers $B^3$, which force the grain as it comes from the reaping-machine against the straw-stop P and into the lower half of the open binding-ring, onto the arms G' of the scale apparatus. When the weight of the grain so treated is sufficient, the arms G' are born down, rocking the shaft G, which, by means of the finger $G^3$ and the catch $c^3$, revolves the wheel C sufficiently to throw it into engagement with the wheel $B^4$. As this starts into operation, it operates, through its pitman $C^2$, to drive the rack-bar D, and this, through the gear $E^2$, rocks the shaft E, and the first operation of this shaft is, through its arm E', to throw the clutch $b\ b'$ out of engagement, thus stopping the operation of the packers $B^3$. At the same time the shaft E is raising the upper part J of the binding-ring, which presently completes its half-circular movement, closing said ring to the position shown in Fig. 7, thus seizing and tightly compressing the bundle of grain which has been gathered around its middle or waist. The wheel $E^2$ has no cogs on a part of its periphery, and by this time the cogged portion thereof has escaped from the rack-bar D. As the rack-bar D leaves its engagement with the wheel $E^2$, the other set of teeth thereon come into engagement with the wheel F' on the end of the shaft F, putting said shaft in motion, and this shaft, as has previously been explained, by means of of its spur gear-wheel $F^2$, engages with the tying mechanism in the binding-ring. This shaft is revolved in one direction until the end of the stroke of the rack-bar D is reached, and is revolved a corresponding distance in the other direction on the return stroke of said rack-bar, thus operating the tying devices and then withdrawing them to their original position. By this time the strike $C^4$ on the wheel C has come in contact with the end of the rod Q', which, through the lever Q, withdraws the pin $q$, unlocking the ring, and the arm $D^4$ on the rack-bar then engages with the arm $E^4$ on the shaft E, starting said shaft slightly and bringing the wheel $E^2$ again into engagement with the appropriate cogs on said rack-bar, and during the consequent partial revolution of said shaft E the movable part of the binding-ring is thrown open, and the arms $E^3$ are at the same time caused to throw off the completed bundle. Said arms $E^3$, as best shown in Fig. 3, are mounted to revolve loosely in one direction upon suitable hubs on the shaft E, and are positioned at points alongside and a little way from the binding-ring, as shown particularly in Fig. 2. Said arms are prevented from revolving in the other direction by a pawl $e^3$, which engages in one notch or the other of a two-notched ratchet-wheel forming part of the hub on which the arm is mounted, which said pawl is held against said ratchet-wheel by a spring $e^4$. These parts are so positioned relative to each other and to the movable part of the binding-ring that as said movable part is swung to its open position the lower ends of these arms will catch the bundle which has been tied and throw it off the machine, while the other ends of the arms come into position to perform a similar service at the proper time for the succeeding bundle. By means of the ratchet-and-pawl arrangement described, said arms are permitted to remain stationary instead of being revolved when the movable binding-ring part is being closed. The stop-arm $J^2$ serves to prevent any straw which might fall over the packers from descending past the binding-ring while said ring is closed and a bundle is being tied by the tying mechanism. The arm E' operates as the binding-ring reaches its open position through the rod $H^2$ to throw the clutch $b\ b'$ into engagement again, as stated above.

The operation just described is repeated continuously as long as the machine is driven.

Having thus fully described my said invention, what I claim as new, and desire to secure by Letters Patent, is—

1. The combination, in an automatic binding apparatus, of a binding-ring composed of two halves, the lower half being stationary and the upper half adapted to be opened and closed, a shaft whereby said upper half is operated, band forming mechanism mounted in said binding ring, a shaft driving a gear-wheel which operates said band forming mechanism, a spur gear-wheel upon the end of said shaft, a spur gear-wheel upon the end of the shaft driving the movable portion of the binding-ring, and a rack-bar adapted to engage successively with the two last-named spur gears, whereby first one of said shafts is revolved and then the other, thus first closing the binding ring and afterward operating the band-forming mechanism.

2. The combination, in the binding and tying mechanism of an automatic binding apparatus, of a wheel C, a reciprocating rack-bar D, a pitman connecting said wheel and said rack-bar, whereby the latter is driven from the former, said rack-bar being provided with two sets of teeth, a shaft E, a movable binding-ring part operated by said shaft, a shaft F, a band-forming mechanism operated by said shaft, said shafts E and F being provided with spur wheels adapted to engage with the racks or sets of teeth of said rack-bar, respectively, the gear-wheel on the shaft E having a portion of its periphery smooth, whereby it is permitted to remain quiet for a portion of the movement, and the teeth of said rack-bar which engage with the wheel on said shaft F occupying a shorter length than the travel of said rack-bar, whereby the opening and closing of the ring and the operation of the band-forming mechanism can be successively and independently effected by a single reciprocation of said rack-bar.

3. The combination, in an automatic binding apparatus, with the two halves of a binding ring, of an automatic locking and unlocking device therefor, consisting of a pin $q$, devices leading therefrom to near a revolving part, a strike $C^4$ on said revolving part whereby said locking pin is moved in one direction, and a spring $q'$ whereby a reverse movement is effected, thus securing an automatic locking and unlocking of the movable part of said ring.

4. The combination, in mechanism for operating the binding and tying devices of an automatic binder, including a binding ring and a band forming mechanism of the reciprocating rack-bar D having two sets of teeth or racks and an arm $D^4$, of two shafts one operating the movable part of said binding ring and the other operating said band-forming mechanism and each carrying a spur gear-wheel and operated by said racks, respectively, of said rack-bar, one of said spur gear-wheels $E^2$ being smooth on a portion of its periphery, and its shaft E being provided with an arm $E^4$, whereby, as said rack-bar continues to move, it may, by means of said arms $D^4$ and $E^4$, throw said spur gear $E^2$ into and out of engagement at predetermined times, substantially as and for the purposes set forth.

5. The combination, in an automatic binding apparatus, of a main shaft, a spur gear wheel thereon, a second spur gear wheel C having a portion of its periphery smooth and adapted to be driven from said spur gear wheel on the main shaft, a reciprocating rack-bar mounted in a suitable way in the framework, a pitman connecting said rack-bar and said last mentioned wheel, a spring catch in the end of the shaft on which said wheel is mounted, a latch recess in said pitman, said parts being arranged as described so that the engagement of said spring catch with said pitman occurs at the same time the spur gear-wheel on the main shaft is opposite the smooth portion of the periphery of the spur gear-wheel C, and means whereby when a predetermined weight of grain has accumulated the spur gear-wheel C will be impelled to engagement with the spur gear-wheel on the main shaft, and the binding apparatus thus set in motion, substantially as set forth.

6. The combination, in an automatic binding apparatus, of the wheel C having the spring catch $c^3$ attached thereto, the tripping or scale apparatus adapted to be operated by the weight of the accumulating grain, and having a rock-shaft with a finger $G^3$ on the end thereof adapted to come in contact with the catch $c^3$ on the wheel C, and thus propel said wheel slightly and throw it into engagement with a wheel on the driving shaft, substantially as set forth.

7. The combination, in an automatic binding apparatus, with the binding ring, of a stop P mounted on a stationary part of said ring and embodying a rack-bar, and a circular rack mounted on a movable part of said ring and engaging with and operating said stop, whereby said stop is held in raised position when the ring is open, and permitted to descend as the ring is closed, substantially as set forth.

8. The combination, in an automatic binding apparatus, of a binding ring consisting of two parts, one stationary and the other movable, said movable part being adapted to move from open to closed position, a shaft forming the hinge-pivot therefor, mechanism for operating said shaft, a second ring mounted in circular ways within the main parts of the binding ring and also composed of two parts, teeth on the periphery of said last-named ring, a shaft parallel with the shaft on which the movable ring-part is mounted, and a spur gear on said last-named shaft projecting into the edge of the binding ring and engaging with the teeth on the periphery of the inner ring thereof, whereby the latter is operated.

9. The combination, in the binding-ring of an automatic binding apparatus, of a stationary main ring part, a movable main ring part, a secondary ring mounted in circular ways in said main ring parts, gearing by which said secondary ring is driven, said secondary ring being provided with toothed segments on its sides, small shafts mounted on the binding-ring parts, small gear-wheels thereon adapted to be operated from said segments, other spur gear-wheels on said small shafts, and tucking fingers operated from said small gear-wheels, which said tucking-fingers move transversely of the binding-ring structure, substantially as set forth.

10. The combination, in the binding-ring of an automatic grain binding apparatus, of a stationary main part, a movable main part, cam grooves in the surfaces of said two main parts, a secondary ring mounted in circular ways in the main ring parts, gathering fingers mounted on said secondary ring, and projections on said gathering fingers engaging with said cam grooves, whereby said fingers are swung outwardly and inwardly and adapted to engage with and carry wisps of straw around the waist of the bundle being tied, substantially as set forth.

11. The combination, with the binding-ring of an automatic binding apparatus, of transversely moving tucking fingers mounted on said binding-ring and provided with heads adapted to engage with the wisps of straw respectively and tuck them under each other, and gathering fingers adapted to bring said wisps of straw into position for said tucking fingers to operate upon, substantially as set forth.

12. The combination, in an automatic binding apparatus, of a binding ring, a secondary ring mounted in circular ways in said binding ring, gathering fingers mounted on said secondary ring, projections on said gathering fingers engaging with the cam grooves in the face of the main binding-ring parts, and projections at or near the inner surface of the binding-ring over which said gathering fingers will draw the wisps of straw gathered from the bundle being tied, and tucking fingers adapted to tuck in the ends of said wisps of straw under the adjacent wisps, substantially as set forth.

13. The combination, in the binding-ring of an automatic binding apparatus, of a stationary main part, a movable main part, a secondary ring, also consisting of two parts, mounted in circular ways in said main parts, and provided with cogs on its periphery by which it is driven, and also provided with segmental racks upon one side, transverse shafts bearing cog-wheels driven from said segmental racks, and also bearing other cog wheels which drive transverse rack-bars mounted in ways in the main binding-ring parts, said rack-bars, tucking fingers connected to and driven by said rack-bars, and gathering fingers mounted upon said secondary ring and operated therefrom and from cam grooves in the main binding-ring parts, said main binding-ring parts also having projections upon or near the inner surface thereof over which to draw the wisps of straw in operation, said several parts being arranged and operating substantially as set forth.

14. The combination, in an automatic binding apparatus, with a binding-ring, one half of which is adapted to be opened and closed, of throwing-off arms mounted upon the same shaft which operates said movable part of the binding-ring, and provided with a ratchet-and-pawl attachment, whereby said arms are moved when the binding-ring is opened, but permitted to remain quiet when the binding-ring is closed, substantially as and for the purposes set forth.

15. The combination, in the binding ring of an automatic grain binding apparatus, of the ring parts provided with lateral projections O, and inwardly-projecting secondary projections o thereon, with the gathering fingers by which the wisps of straw are selected from the bundle, whereby said wisps are more accurately bent and held in position, substantially as set forth.

In witness whereof I have hereunto set my hand and seal, at Indianapolis, Indiana, this 27th day of July, A. D. 1894.

JOHN J. GAYNOR. [L. S.]

Witnesses:
ROBERT G. HARSLIM,
CHESTER BRADFORD.